United States Patent
Kinishi et al.

(10) Patent No.: US 12,188,857 B2
(45) Date of Patent: Jan. 7, 2025

(54) FLOW CYTOMETER HAVING CONFIGURED CONTROLLER

(71) Applicant: SYSMEX CORPORATION, Kobe (JP)

(72) Inventors: Motoi Kinishi, Kobe (JP); Shohei Kamura, Kobe (JP); Hiroo Tatsutani, Kobe (JP); Takashi Yoshioka, Kobe (JP); Takayuki Nakajima, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 598 days.

(21) Appl. No.: 15/936,711

(22) Filed: Mar. 27, 2018

(65) Prior Publication Data

US 2018/0284008 A1    Oct. 4, 2018

(30) Foreign Application Priority Data

Mar. 30, 2017    (JP) .................................. 2017-067469

(51) Int. Cl.
*G01N 15/14* (2024.01)
*G01N 15/1404* (2024.01)
(Continued)

(52) U.S. Cl.
CPC ..... *G01N 15/1425* (2013.01); *G01N 15/1404* (2013.01); *G01N 15/1434* (2013.01);
(Continued)

(58) Field of Classification Search
CPC ................ G01N 15/14; G01N 15/1404; G01N 15/1425; G01N 15/1434; G01N 35/00871
See application file for complete search history.

(56) References Cited

U.S. PATENT DOCUMENTS

| 5,408,307 A * | 4/1995 | Yamamoto ......... G01N 15/1456 356/336 |
| 5,488,469 A * | 1/1996 | Yamamoto ......... G01N 15/1404 356/39 |

(Continued)

FOREIGN PATENT DOCUMENTS

| CN | 105164508 A | 12/2015 |
| EP | 0350837 A2 | 1/1990 |

(Continued)

OTHER PUBLICATIONS

Communication pursuant to Article 94(3) EPC issued on Dec. 5, 2019 in a counterpart European patent application No. 18164218.2.

(Continued)

*Primary Examiner* — Jennifer Wecker
*Assistant Examiner* — Michelle Adams
(74) *Attorney, Agent, or Firm* — Crowell & Moring LLP

(57) ABSTRACT

A flow cytometer capable of easily and reliably providing flow cytometry results without requiring a special trained technician is provided. The flow cytometer 10 includes an input unit 60 that receives an input of information for specifying a measurement item, a condition selection unit 71 for selecting a measurement condition from among one or a plurality of measurement conditions corresponding to information for specifying the measurement item received by the input unit 60, and a measurement unit 65 having a flow cell 20 through which a particle-containing liquid containing particles in the sample passes, wherein the measurement unit 65 optically measures particles of the particle-containing liquid flowing through the flow cell 20 in accordance with the measurement condition selected by the condition selection unit 71.

18 Claims, 16 Drawing Sheets

(51) Int. Cl.
   *G01N 15/1434* (2024.01)
   *G01N 35/00* (2006.01)
(52) U.S. Cl.
   CPC ... *G01N 15/1436* (2013.01); *G01N 35/00871* (2013.01); *G01N 2035/00891* (2013.01)

(56) References Cited

U.S. PATENT DOCUMENTS

| | | | |
|---|---|---|---|
| 2003/0032193 A1* | 2/2003 | Narisada | G01N 15/1459 436/63 |
| 2003/0143117 A1 | 7/2003 | Nagai et al. | |
| 2007/0231206 A1 | 10/2007 | Nagai et al. | |
| 2009/0323062 A1 | 12/2009 | Ariyoshi et al. | |
| 2014/0093949 A1 | 4/2014 | Norton et al. | |
| 2016/0025621 A1* | 1/2016 | Kapinsky | G01N 15/1425 702/30 |
| 2018/0253194 A1* | 9/2018 | Javadi | G06F 8/38 |

FOREIGN PATENT DOCUMENTS

| | | |
|---|---|---|
| EP | 0350837 B1 | 6/1994 |
| JP | H2-22537 A | 1/1990 |
| JP | H5-180831 A | 7/1993 |
| JP | 2003-287491 A | 10/2003 |
| JP | 2006-162484 A | 6/2006 |
| JP | 2010-14405 A | 1/2010 |
| JP | 2010-169573 A | 8/2010 |
| JP | 2011-137662 A | 7/2011 |
| JP | 2012-107985 A | 6/2012 |
| JP | 2015-536643 A | 12/2015 |
| WO | WO 2014/127285 A1 | 8/2014 |

OTHER PUBLICATIONS

Communication pursuant to Article 94(3) EPC issued on Jul. 29, 2020 in a counterpart European patent application No. 18164218.2.
Office Action issued on Nov. 18, 2020 in a counterpart Chinese patent application No. 201810238964.8.
Japanese Office Action issued on Feb. 24, 2021 in a counterpart Japanese patent application No. 2017-067469.
Japanese Office Action issued on Jul. 6, 2021 in a counterpart Japanese patent application No. 2017-067469.
Chinese Office Action issued on Mar. 8, 2022 in a counterpart Chinese patent application No. 201810238964.8
Chinese Office Action issued on Oct. 8, 2021 in a counterpart Chinese patent application No. 201810238964.8.
Communication pursuant to Article 94(3) EPC issued on Nov. 9, 2021 in a counterpart European patent application No. 18164218.2.
Japanese Office Action issued on Sep. 6, 2022 in a counterpart Japanese patent application No. 2021-143099.
Japanese Office Action issued on Dec. 13, 2022 in a counterpart Japanese patent application No. 2021-143099.

* cited by examiner

Measurement condition file information

| No. | Classification (1) | Classification (2) | Item name |
|---|---|---|---|
| 1 | | Basic info | Measurement condition ID |
| 2 | | | Measurement condition name |
| 3 | | | Comment |
| 4 | | | Analysis capacity |
| 5 | Basic measurement info | Measurement info | Flow rate ID |
| 6 | | | Dilution ratio |
| 7 | | | Threshold (FSC) |
| 8 | | | Threshold (SSC) |
| 9 | | Threshold value | Threshold (FL4) |
| 10 | | | Threshold (FL1) |
| 11 | | | Threshold (FL2) |
| 12 | | | Threshold (FL3) |
| | | | Threshold (FL4) |
| 13 | Detection sensitivity adj. info | Amplification value | Amplification value (FSC) |
| 14 | | | Amplification value (SSC) |
| 15 | | PMT voltage | PMT voltage (PL1) |
| 16 | | | PMT voltage (PL2) |
| 17 | | | PMT voltage (PL3) |
| 18 | | | PMT voltage (PL4) |
| 19 | Optical info correction info | Fluorescence correction value | Fluorescence Correction (FL1-FL2) |
| 20 | | | Fluorescence Correction (FL1-FL3) |
| 21 | | | Fluorescence Correction (FL1-FL4) |
| 22 | | | Fluorescence Correction (FL2-FL1) |
| 23 | | | Fluorescence Correction (FL2-FL3) |
| 24 | | | Fluorescence Correction (FL2-FL4) |
| 25 | | | Fluorescence Correction (FL3-FL1) |
| 26 | | | Fluorescence Correction (FL3-FL2) |
| 27 | | | Fluorescence Correction (FL3-FL4) |
| 28 | | | Fluorescence Correction (FL4-FL1) |
| 29 | | | Fluorescence Correction (FL4-FL2) |
| 30 | | | Fluorescence Correction (FL4-FL3) |
| 31 | Gating info | Scattergram info | Scattergram |
| 32 | | | Upper gate |
| 33 | | | X-axis ch |
| 34 | | | X-axis ch name |
| 35 | | | Y-axis ch |
| 36 | | | Y-axis ch name |
| 37 | | Histogram info | Histogram name |
| 38 | | | Upper gate |
| 39 | | | X-axis ch |
| 40 | | | X-axis ch name |
| 41 | | Gate info | Gate name |
| 42 | | | Position info |
| 43 | | | Color |
| 44 | | | Measurement item name |
| 45 | | | Upper limit |
| 46 | | | Lower limit |
| 47 | | | Result value type |
| 48 | Temp. correction Eq. | | |

FLOW CYTOMETER HAVING CONFIGURED CONTROLLER

CROSS REFERENCE TO RELATED APPLICATIONS

This application claims priority from prior Japanese Patent Application Publication No. 2017-067469, filed on Mar. 30, 2017; entitled "FLOW CYTOMETER AND PARTICLE DETECTION METHOD", the entire contents of which are incorporated herein by reference.

FIELD OF THE INVENTION

The present invention relates to a flow cytometer and a particle detection method, and specifically relates to a flow cytometer and a particle detection method that easily set measurement conditions.

BACKGROUND

Flow cytometry uses a flow cytometer capable of individually detecting individual particles by the sheath flow method, optically detects the size, structure, fluorescence intensity and the like of individual particles dispersed in the liquid, and measures the number and distribution of particles based on the detected information. As for flow cytometers, there are general-purpose flow cytometers having a broad application range in which parameters such as measurement conditions of particles can be set according to user's needs, and a dedicated flow cytometers dedicated to the detection of specific particle types (for example, refer to Japanese Patent Application Publication No. 2003-287491).

Flow cytometry can be combined with fluorescent immunostaining to detect various antigens present on the cell surface and intracellularly, and is particularly useful in cell analysis. In the case of initially developed flow cytometers, one type of fluorescent dye was used, and one kind of antigen had to be detected. That is, when multiple types of antigens are present on the cell surface, the number of assays had to be increased according to the number of antigens to be detected, and the number of cells to be sampled for measurement had to be increased according to the number of assays. Currently, however, analytical techniques necessary for flow cytometry have dramatically advanced, such as stabilization and multicolorization of fluorescent dyes, development of various laser light sources used to excite fluorescent dyes, and enhancement of the detection antibody lineup in conjunction with the mass production of various antigens through genetic recombination technology and the like. Many proteins and surface markers also were identified by determining the whole gene sequences of humans and mice. As a result, there are enormous numbers of antigens and intracellular markers that can be analyzed by flow cytometry. With the progress of such analytical techniques and an increase in antigens and the like to be analyzed, the mainstream of current flow cytometry is multicolor flow cytometry that simultaneously measures from several to several tens of antigens in one assay.

However, multicolor flow cytometry is problematic in that setting of the conditions necessary for measurement include a stage of immunostaining the cells and is remarkably complicated. For example, although the number of antigens that can be analyzed at one time has increased in conjunction with the multicolorization of fluorescent dyes, it is necessary to adjust the sensitivity of the flow cytometer for each excitation laser light source for each fluorescent dye so that each fluorescent dye can be detected most accurately in order to simultaneously detect a plurality of fluorescent dyes. Depending on the combination of the fluorescent dyes, one fluorescent dye may interfere with or amplify the fluorescence intensity of another fluorescent dye, such that it is necessary to know the compatibility of the fluorescent dye to be combined. It is necessary to perform fluorescence correction on the actual measured value of fluorescence intensity regarding the wavelength region where two or more kinds of fluorescence spectra overlap. While it also is a matter of course that antigens are selected according to the type of cells to be detected in order to detect a large number of antigens in one assay, the absence of cross reactivity of the detection antibody and non-target antibodies measured at the same time must be ensured beforehand, information on the characteristics of the antibody is also required before applying the immunostained cells to the flow cytometer, such as using different assays between cross-reactive antigens. Therefore, in order to obtain reliable results with high reproducibility in multicolor flow cytometry, it is necessary for a person who carries out multicolor flow cytometry to acquire a huge amount of knowledge to cope with the complicated condition setting described above.

In order to train technologists who can cope with complex multicolor flow cytometry, the provider of the flow cytometer holds a seminar for those dealing with flow cytometry to disseminate flow cytometry technology and improve the skills of technologists. The Japan Cytometry Society established a certification system for cytometry technologists to train technologists above a prescribed level and to improve the technical standards.

That is, investigations to solve the problem of overcoming the complexity of multicolor flow cytometry as described above are not directed to improving the hardware and software of the flow cytometer itself, but to develop or educate technologists.

SUMMARY OF THE INVENTION

Flow cytometry is a technology which greatly contributes to the diagnosis of disease, the determination of the stage of disease, and the determination of therapeutic course. For example, the CD4/CD8 ratio of T lymphocytes is an examination item that was measured using free cytometry from the initial development of flow cytometry, and the ratio of CD4/CD8 was originally used as an indicator to evaluate the immune system of patients infected with human immunodeficiency virus (HIV). Currently, the CD4/CD8 ratio also is used for the diagnosis of acute diseases such as acute organ transplant rejection and acute graft-versus-host disease.

Due to the popularization of flow cytometry, it has become possible to accurately know the cell line of tumor cells, and the diagnosis of hematopoietic tumors heretofore based on cell morphological observation, enzyme staining, and immunostaining has largely migrated to diagnosis based on profiling of cell surface markers. Whether a colony stimulating factor such as G-CSF can be administered to prevent a compromised condition of a patient caused by administration of an anti-cancer agent is greatly influenced by the cell line of the tumor cell. Although the survival rate of hematopoietic tumor patients has dramatically improved through the dissemination of G-CSF, the improvement of flow cytometry technology in the background has made it possible to accurately comprehend the cell line of tumor cells. However, since flow cytometry as a rule must use cells within 24 hours after being collected, it is necessary for the flow cytometer to be prepared so that flow cytometry can be performed at any time in accordance with the patient's condition.

During initial development, flow cytometry was used for diagnosing diseases that follow a chronic course, but now is very useful for diagnosis of acute phase disease. In order to diagnose acute disease, it is also necessary to respond to sudden changes in the patient's condition. However, flow cytometry is often outsourced in general hospitals since current flow cytometers have complex set-ups of measurement conditions that can only handled by trained technicians. For this reason, flow cytometry cannot be performed with a required timing such as when an examination is urgently needed in a hospital where there is no technician, and as a result, there is concern of delay in coping with the patient. In order to be able to perform highly reliable flow cytometry at hospitals or the like at any time, it is necessary to improve the hardware and software of the flow cytometer itself rather than the training of technicians, and requires construction of a flow cytometer that does not require a highly trained technician.

The flow cytometer of the invention includes an input unit that receives an input of information for specifying a measurement item, a condition selection unit for selecting a measurement condition from among one or a plurality of measurement conditions corresponding to information for specifying the measurement item received by the input unit, and a measurement unit having a flow cell through which a particle-containing liquid containing particles in the sample passes, wherein the measurement unit optically measures particles of the particle-containing liquid flowing through the flow cell in accordance with the measurement condition selected by the condition selection unit.

BRIEF DESCRIPTION OF THE DRAWINGS

FIG. 4 is a diagram showing an example of information included in measurement conditions; In the drawing, FSC indicates forward scattered light, SSC indicates side scattered light, and FL1, FL2, FL3, and FL4 indicate four types of fluorescence with different peak wavelengths; Also, ch indicates a channel;

FIG. 7 is a diagram showing a screen for creating a new measurement condition;

DESCRIPTION OF THE EMBODIMENTS OF THE INVENTION

The first embodiment will be described below. However, the present invention is not limited to only the embodiment shown in this embodiment.

Flow Cytometer and External Server

Figure 1A:
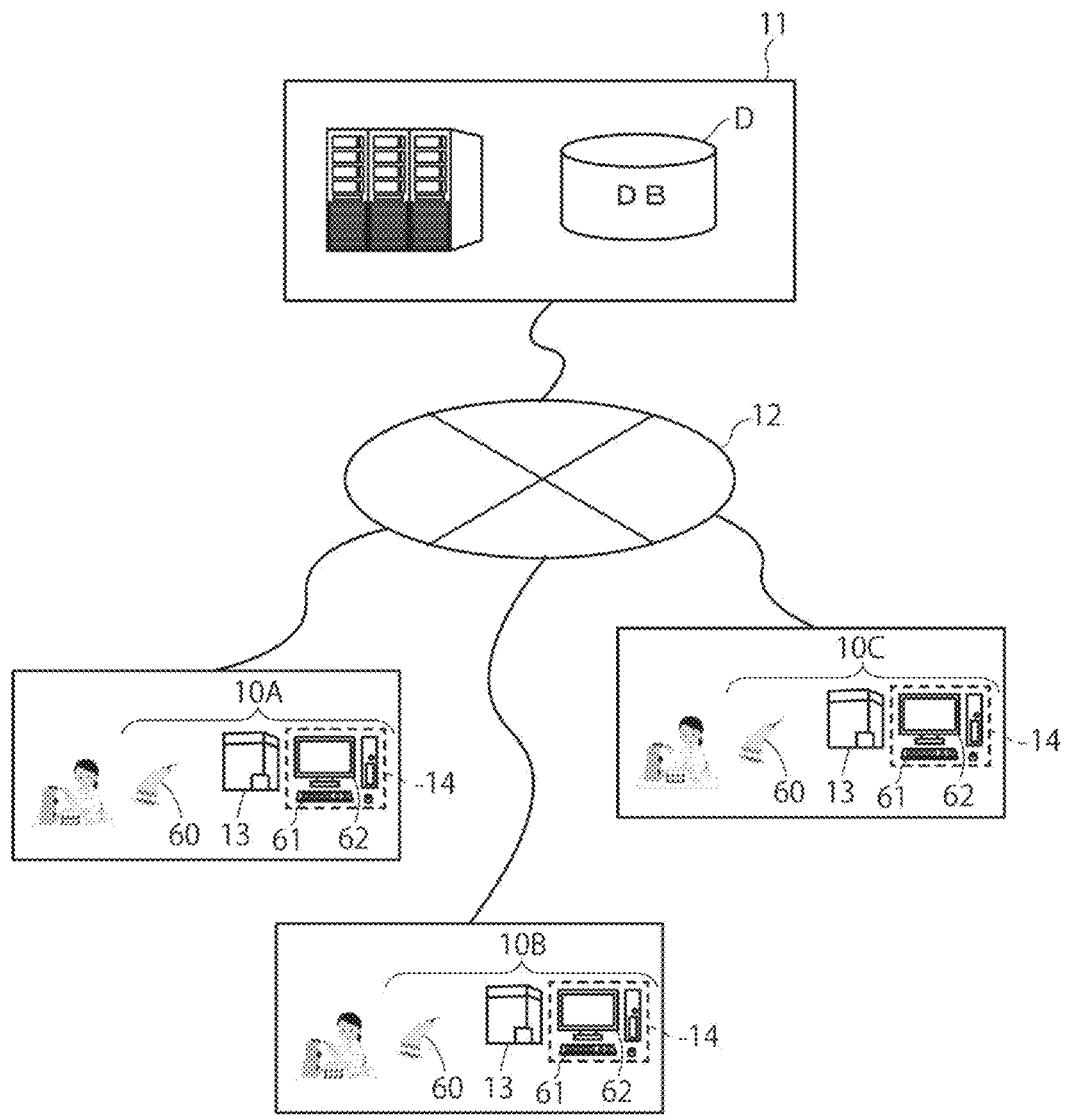
FIG. 1A is a brief diagram showing the connection between a flow cytometer and an external server.

The flow cytometer is installed in, for example, a hospital, a laboratory or the like, and is connected to the external server 11 via a network 12 such as the Internet as shown in FIG. 1A. In FIG. 1A, a plurality of flow cytometers 10A to 10C are connected to the external server 11. The network 12 is a communication medium such as the Internet, a virtual private network (VPN), a wide area communication network (WAN), a public switched telephone network (PSTN) or the like, and is not limited insofar as communication between the external server 11 and the flow cytometer 10 is possible. Hereinafter, when there is no need to distinguish the flow cytometers 10A to 10C, the flow cytometer is simply referred to as "flow cytometer 10".

The external server 11 is installed in a database center or the like and has a storage device for storing the database D. The database D includes measurement conditions corresponding to information for specifying measurement items of the flow cytometer 10. The flow cytometer 10 receives the measurement condition from the external server 11 via the network 12. The database D of the external server 11 is configured to accept changes and additions of measurement conditions at any time from the server administrator. In a general-purpose flow cytometer such as the flow cytometer 10, since it is possible to add new measurement items applicable to a reagent and even the same reagent at any time, it becomes possible to provide new measurement items and measurement conditions to the flow cytometer of the user facility by having the server administrator register the measurement condition/s corresponding to the new measurement item/s in the database D.

In this case, the measurement item is one or more items measured by the flow cytometer 10, and is, for example, the type of the particle, the kind of the substance present in the particle and the like. Specifically, the type of cell, type of protein, kind of sugar chain, kind of lipid, type of glycoprotein, type of glycolipid, kind of lipoprotein, kind of nucleic acid, kind of biological component such as cylinder and the like can be mentioned. The information for specifying the measurement item is not limited insofar as the measurement item can be specified. For example, the measurement item may be the name of the measurement item itself, or the type of stain which stains the particle, the substrate of the enzyme, information on the reagent necessary for detecting particles such as antibodies, or the name of the antigen. The information for specifying the measurement item also includes identification information of the reagent mixed with the particles in order to measure the measurement item.

The number of flow cytometers 10 connected to the external server 11 is not limited, and a single flow cytometer 10 also may be connected to the external server 11.

Figure 1B:
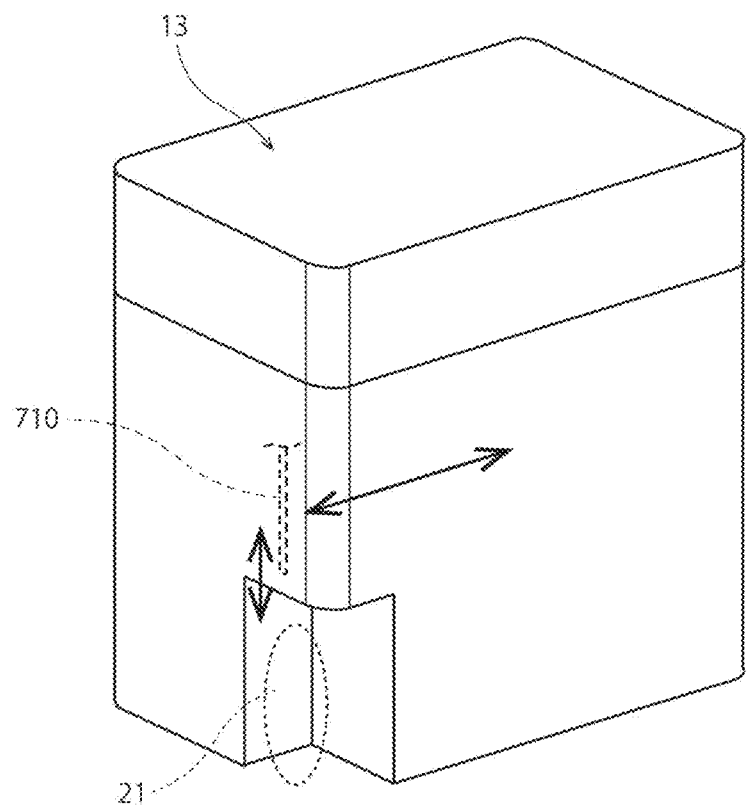
FIG. 1B is an external view of a flow cytometer.

As shown in FIG. 1A, the flow cytometer 10 includes a flow cytometer main body 13, and an information processing device 14 connected to the flow cytometer main body 13. As shown in FIG. 1B, the flow cytometer main body 13 is provided with a suction unit 710 configured to be able to move up and down and move horizontally. The user positions the sample container containing a manually prepared measurement sample at the position 21 outside the flow cytometer main body 13 to measure the measurement sample in the sample container. The suction unit 710 moves just above the position 21 and the measurement sample is suctioned from the sample container positioned at the position 21.

Optical System of Flow Cytometer

Figure 2:
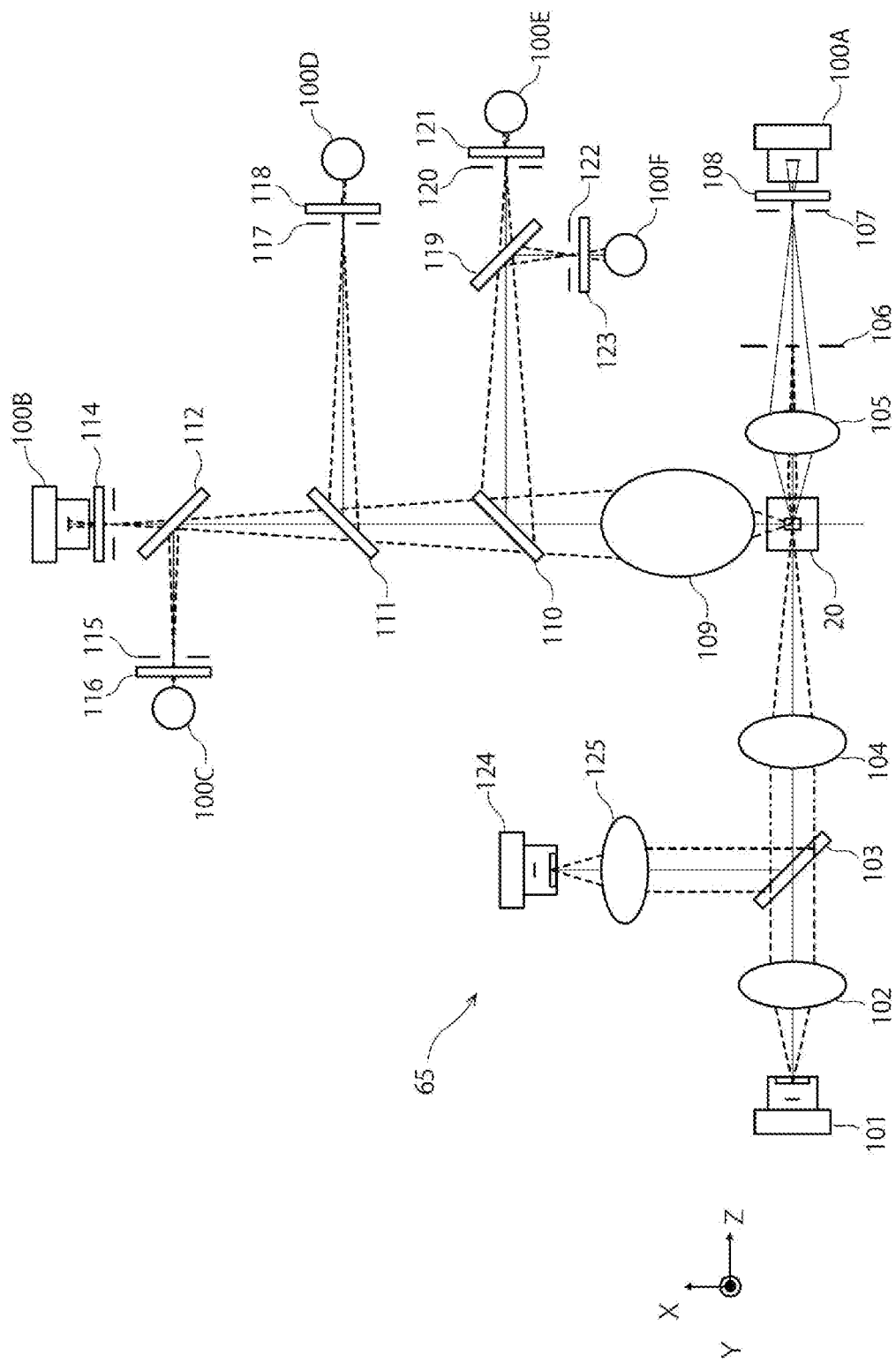
FIG. 2 is a brief diagram showing an optical system of a flow cytometer.

FIG. 2 is a brief diagram showing the optical system of the flow cytometer 10 according to one embodiment. The flow cytometer 10 includes a flow cell 20 through which a particle-containing liquid containing particles in a sample passes, light sources 101 and 124 for irradiating light on particles passing through the flow cell 20, and light receiving elements 100A to 100F for optically detecting optical information on light derived from the particles and outputting a detection signal converted into an electric signal.

Here, the sample is a suspension of particles suctioned by the flow cytometer. The particles may be artificial particles such as magnetic beads or plastic beads. The particles also may be biological components such as cylinders, and also may be microorganisms, animal cells, plant cells and the like.

It is preferable that the particles emit one or more lights when irradiated with predetermined light. Light emitted from particles when irradiated with predetermined light is collectively referred to as light derived from particles. Light derived from the particles includes scattered light and luminescence. The light derived from the particles may be light of any wavelength, but preferably is light having a peak wavelength in the range of 400 nm to 850 nm. More specifically, the light derived from the particles is preferably fluorescence. The light derived from the particles also may be light emitted by a substance contained in the particles themselves. Alternatively, light derived from the particles may be labeled with a luminescent substance such as a fluorescent substance, and light emitted from the luminescent substance may be detected as light derived from the particles. The peak wavelength of light derived from particles is preferably different for each measurement item.

The particle-containing liquid is a liquid containing the particle suspension liquid suctioned from the sample into the flow cytometer, and includes a diluting liquid as necessary.

The optical information is information included in one or two or more light wavelength spectra emitted from particles. The light wavelength spectra include the individual light wavelengths and light wavelength regions included in a light wavelength spectrum and the respective light wavelengths or the intensities of the light wavelength regions. Individual light wavelengths and wavelength ranges can be specified by which one of the one or more light receiving elements described later has received light. Each light wavelength or intensity of each light wavelength region can be specified by an electric signal output from the light receiving elements 100A to 100F which have received light.

The case where light derived from particles is scattered light and fluorescence will be specifically described hereinafter as an example.

The light emitted from the light source 101 irradiates the flow cell 20 via the collimator lens 102, the dichroic mirror 103, and the condenser lens 104. The forward scattered light of the light derived from the particles passing through the flow cell 20 is collected by the condenser lens 105 and enters the light receiving element 100A via the beam stopper 106, the pinhole plate 107, and the band pass filter 108.

On the other hand, side scattered light and lateral fluorescence derived from the particles passing through the flow cell 20 are collected by the condenser lens 109. The side scattered light enters the light receiving element 100B via the dichroic mirrors 110, 111, 112, the pinhole plate 103, and the band pass filter 114. The lateral fluorescence having a wavelength of 520 nm or more and 542 nm or less passes through the dichroic mirrors 110 and 111, is reflected by the dichroic mirror 112, and enters the light receiving element 100C via the pinhole plate 115 and the band pass filter 116. The lateral fluorescence having a wavelength of 570 nm or more and 620 nm or less passes through the dichroic mirror 110, is reflected by the dichroic mirror 111, and enters the light receiving element 100D via the pinhole plate 117 and the bandpass filter 118. The lateral fluorescence having a wavelength of 670 nm or more and 800 nm or less also is reflected by the dichroic mirror 110, passes through the dichroic mirror 119, and enters the light receiving element 100E via the pinhole plate 120 and the bandpass filter 121.

The light emitted from the light source 124 irradiates the flow cell 20 via the collimator lens 125, the dichroic mirror 103, and the condenser lens 104. The lateral fluorescence of the light derived from the particles passing through the flow cell 20 is collected by the condenser lens 109. The lateral fluorescent light of 662.5 nm or more and 687.5 nm or less is reflected by the dichroic mirror 110, reflected by the dichroic mirror 119, then enters the light receiving element 100F via the pin hole plate 122 and the band pass filter 123.

In the present embodiment, a laser diode with a wavelength of 488 nm is used for the light source 101, and a laser diode with a wavelength of 642 nm is used for the light source 124. A sheath flow cell is used for the flow cell 20. A photodiode also is used for the light receiving element 100A for receiving the forward scattered light, an avalanche photodiode (APD) is used for the light receiving element 100B for receiving the side scattered light, and photomultiplier tubes (Photo Multiplier Tube, PMT) are used for light receiving elements 100C to 100F. In the present embodiment, the flow cytometer 10 includes six light receiving elements 100A to 100B, and the four light receiving elements 100C to 100F are for respectively detecting optical information of the four lights having different peak wavelengths derived from a stain bonded to particles in a sample, but the invention is not limited to this and it is also possible to provide three or more light receiving elements and at least two or more of the three or more light receiving elements may detect optical information of light originating from at least two stains having different peak wavelengths. For example, when four kinds of labeled antibody stains respectively binding to CD4, CD45, CD8, and CD3 are used in HIV examination, four fluorescent lights having four peak wavelengths derived from the respective labeled antibody stains are used as the measurement sample, and each fluorescence can be detected by the four light receiving elements 100C to 100F.

The number of light sources may be one, or two or more. The light source is selected according to the wavelength region of light derived from the stain bound to the particle. When the light sources are 2 or more, it is preferable that these light sources emit light having different peak wavelengths. Two light sources or more are preferable because it is possible to separate and detect fluorescence with high accuracy as compared with the case where there is only one light source. For example, when one light source is used in HIV testing, FITC is used as a labeled antibody dye for CD4 and PEcy5 is used as a labeled antibody dye for CD8; however, the peak wavelength of fluorescence from FITC and fluorescence from PEcy 5 are close to each other and the overlapping portions of the respective wavelength regions tend to be large. On the other hand, when using two light sources it is possible to separate and detect a plurality of fluorescences by shifting the light emission timing from each light source. It is also possible to reduce the overlapping portion of the respective wavelength regions of the plurality of fluorescences by using a dye suitable for the peak wavelength of light from each light source. For example, APC instead of PEcy 5 can be used as a labeled antibody dye for CD8. The number of photodiodes, dichroic mirrors, and bandpass filters can be varied according to the number of peak wavelengths of light derived from the particles. The types of photodiodes, dichroic mirrors, and bandpass filters can also be selected according to the peak wavelength of light derived from the particle, the wavelength region, and the intensity thereof.

Figure 3:
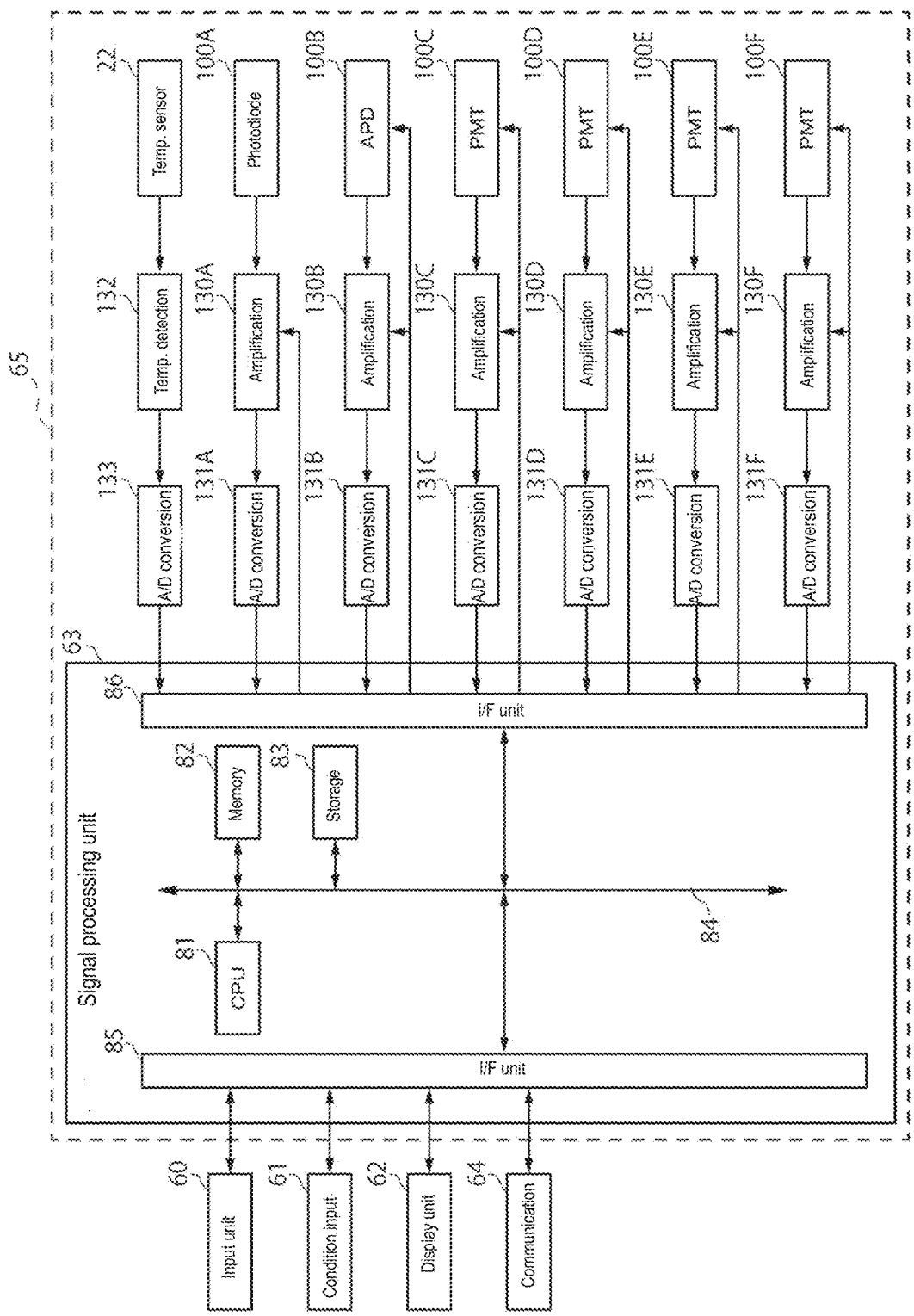
FIG. 3 is a block diagram showing an information processing system of a flow cytometer.
Figure 5:
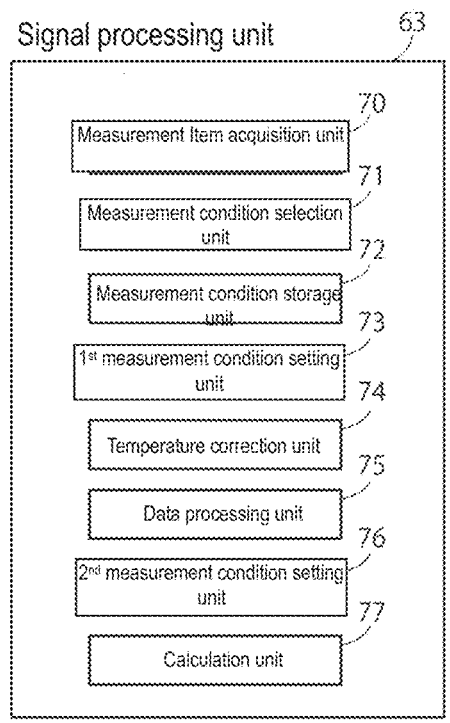
FIG. 5 is a function block diagram of a signal processing unit.
Figure 6:
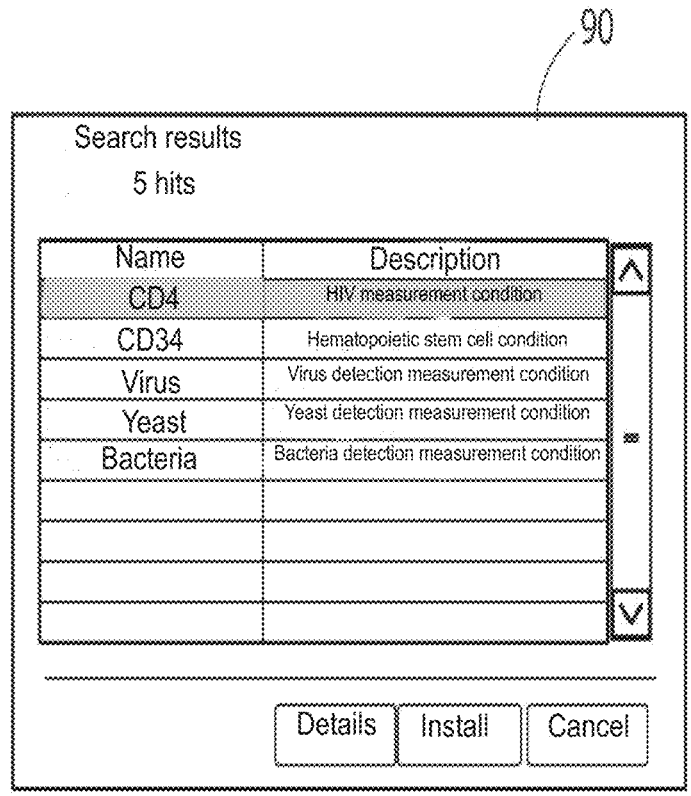
FIG. 6 shows a screen showing a measurement condition candidate list.

As shown in FIG. 3, the detection signals output from the light receiving elements 100A to 100F are amplified by the amplifying sections 130A to 130F, subjected to A/D conversion by the A/D conversion units 131A to 131F, and input to the signal processing unit 63. Specifically, the amplifying units 130A and 130B connected to the light receiving element 100A which is a photodiode and the light receiving element 100B which is an APD are known amplifying circuits configured by operational amplifiers or the like, and the output voltages of the light receiving elements 100A and 100B to be input are adjusted by adjusting the amplification degree of each amplifier circuit. The output voltage of the PMT is adjusted by adjusting the voltage value applied to the light receiving elements 100C to 100F which are PMTs. Hereinafter, the adjustment of the detection sensitivity of the light receiving elements 100A to 100F refers to adjustment of the degree of amplification of the amplifying circuit in the light receiving elements 100A and 100B, and the adjustment of the voltage applied to the light receiving elements 100C to 100F in the light receiving circuits 100C to 100F. The detection signal output from the light receiving element is amplified by adjusting the amplification degree in the amplification circuit in the light receiving elements 100A and 100B, and the detection signal output by the light receiving elements 100C to 100F is adjusted by adjusting the voltage applied to the light receiving elements 100C to 100F. Note that amplification includes the case where the ratio of the output signal to the input signal is 1 or more and the case where the ratio is less than 1. Known amplification circuits also may be included in the amplifying units 130C to 130F connected to the light receiving elements 100C to 100F, and adjustment of the detection sensitivity of the light receiving elements 100C to 100F also may include adjusting the output voltages of the light receiving elements 100C to 100F via the amplification circuits.

The flow cytometer 10 is provided with the structure of FIG. 2 that includes a light source 124, the flow cell 20, and the light receiving elements 100A to 100F, the amplifying sections 130A to 130F, and a measurement unit 65 that includes the A/D conversion units 131A to 131F, the signal processing unit 63, and a temperature sensor 22 to be described later. The measurement unit 65 optically measures the particles in the particle-containing liquid passing through the flow cell 20 according to the measurement condition received by the communication unit 64 described later. Here, measurement includes detecting optical information of light derived from the particles by the light receiving elements 100A to 100F and storing the detection signals output by the light receiving elements 100A to 100F, and also includes processes performed by the signal processing unit 63 (to be described later) such as, for example, generating the particle count result and the like using the stored detection signals. The detection signals output from the light receiving elements 100A to 100F include signals output from the A/D conversion units 131A to 131F via the amplifiers 130A to 130F.

As shown in FIG. 1A, the flow cytometer 10 includes a flow cytometer main body 13 and an information processing apparatus 14 connected to the flow cytometer main body 13, and the structure of FIG. 2 incorporating the light source 124, flow cell 20, and light receiving elements 100A to 100F of the measurement unit 65, as well as the amplification units 130A to 130F, and the A/D conversion units 131A to 131F are arranged in the flow cytometer main body 13. The signal processing unit 63 also is arranged in the information processing apparatus 14. Note that, when the flow cytometer 10 does not include the information processing device 14, the signal processing unit 63 may be disposed in the flow cytometer main body 13. The flow cytometer 10 also has a control unit for controlling a pump, a motor and the like (not shown) in order to perform measurements by passing the particle-containing liquid through the flow cell 20, although the signal processing unit 63 may also serve as this control unit, or this control unit may be separately arranged in the information processing apparatus 14 or the flow cytometer main body 13.

Measurement Conditions

As described above, the flow cytometer 10 receives the measurement condition from the external server 11 in order to set the measurement condition according to the measurement item prior to the measurement. FIG. 4 shows an example of information included in the received measurement condition in the case where the light derived from the particle is fluorescent. The measurement condition includes basic information relating to measurement (hereinafter referred to as "basic measurement information"), information relating to adjustment of detection sensitivity for detecting optical information (hereinafter referred to as "information relating to adjustment of detection sensitivity"), information relating to correction of the detected optical information, information related to gating for setting an area of the particles to be selected based on the optical information (hereinafter referred to as "information related to gating"), and a calculation formula for use in temperature correction described later.

The basic measurement information includes basic information, measurement information, and a threshold value. The basic information includes identification information (referred to as "measurement condition ID" in FIG. 4) for identifying the type of measurement condition and a measurement condition name. The measurement information includes the analytical capacity of the sample suctioned into the flow cytometer, the flow rate indicating the flow speed when the particles flow into the flow cytometer, and the dilution ratio of the sample suctioned into the flow cytometer. The threshold value is also called a detection level and is a set value of the lower limit of the optical information detected as particles. The threshold value is set for each light receiving element 100A to 100F with respect to light originating from the particle. For example, the threshold value can be set within a numerical value range of 0 to 1023 according to the intensity of light. If the threshold value is set at 50, light having a light intensity of 50 or more is detected as a particle.

Information relating to adjustment of the detection sensitivity includes at least one of a value indicating the amplification degree of the output voltage of the light receiving elements 100A to 100F, and a voltage value applied to the light receiving elements 100A to 100F. For example, an amplification value for adjusting the amplification degree of the amplification circuit connected to the light receiving elements 100A and 100B and a PMT voltage value for adjusting the voltage applied to the light receiving elements 100C to 100F. Note that the information may include only one of the amplification value and the PMT voltage value. When the amplification circuit is connected to the light receiving elements 100C to 100F, the information may include an amplification value for adjusting the amplification degree in the amplifying circuit.

The information related to the correction of the detected optical information includes information on the light wavelength distribution amount outside the detection target included in the optical information detected by the light receiving elements 100A to 100F. This is because when two or more lights with different peak wavelengths emitted by particles are detected in one measurement, the wavelength regions of the two or more lights may partially overlap one another. Therefore, the light which is not the detection target leaks into the light to be detected, and the specificity of detection of light may decrease. The distribution of the wavelength of the light and the amount of light are referred to as the light wavelength distribution amount, and the distribution of the wavelength of the leaked light and its amount are referred to as the non-detection target light wavelength distribution amount. Since the light receiving elements 100C to 100F can not distinguish the received overlapping portions of the wavelength ranges of two or more lights, so-called fluorescence correction is performed to remove the electrical signals originating from the non-detection target fluorescence, and capture only the optical information from the fluorescence to be detected from the electric signals of the light receiving elements 100C to 100F. Information relating to the light wavelength distribution amount outside the detection target included in the detected optical information is indicated as a fluorescence correction value in FIG. 4, and is used for this fluorescence correction. The simplest fluorescence correction value is the light wavelength distribution amount of the fluorescence which is not to be detected that should be subtracted from the light wavelength distribution amount of the fluorescence to be detected. For example, when fluorescence having two different peak wavelengths is defined as fluorescence 1 and fluorescence 2, and if the light wavelength distribution does not overlap between fluorescence 1 and fluorescence 2 and there is no need for fluorescence correction, the fluorescence correction value of fluorescence 1 is 0.0. On the other hand, when fluorescence 1 and fluorescence 2 are simultaneously measured, the light distribution wavelengths overlap; when the overlapping light wavelength distribution amount is 27.5%, the fluorescence correction value can be set to 27.5 to subtract the fluorescence distribution amount derived from fluorescence 2 is calculated from the fluorescence distribution amount of fluorescence 1.

Information related to gating includes information related to a distribution setting on a distribution map of light derived from particles. In the flow cytometer, a distribution diagram of light originating from particles called a scattergram or a histogram, and is created for one measurement item or for each of two or more measurement items from the detected optical information. The scattergram represents the distribution of light originating from the particle on the two axes of X axis and Y axis for two measurement items. The histogram is represented by the intensity of light and the number of its particles for one measurement item. Gating refers to selection of a fixed distribution region corresponding to a measurement item in a distribution map for appropriate measurement according to the measurement item relative to the respective distribution map. More specifically, gating means setting the following information.

Information relating to the scattergram, information related to the histogram, and information related to gating is included in the distribution setting information on distribution of light derived from particles. The information relating to the scattergram is information for creating a scattergram, and includes the scattergram name which indicates the name of the scattergram to be created, the upper gate, X-axis channel (referred to as "X-axis channel") indicating the photodiode receiving the light representing a first measurement item, X-axis channel name, Y-axis channel (referred to as Y-axis channel) indicating the photodiode receiving light representing a second measurement item, and Y-axis channel name. The information related to the histogram is information for creating a histogram, and includes a histogram name, an upper gate, an X axis channel indicating the photodiode receiving light representing the measurement item, and X-axis channel name. The upper gate indicates the gate of the previously created scattergram when creating respectively corresponding scattergrams using two or more gates. The information related to the gate is for determining the area of each particle selected from the scattergram and the histogram, and includes a gate name which is the name of the selected gate, position information indicating the position of the gate, a color given on the display unit for the received light wavelength or wavelength range, the measurement item name, the upper limit value of the intensity of the received light, the lower limit value of the intensity of the received light, and the result value type when displaying the analysis result. The result value types are various statistical processing values of the result, for example, the total number of particles, the average value, the variation coefficient, the ratio to the whole, the mode, and the like.

The number of scattergrams and histograms created differs depending on measurement items. Therefore, there are cases where a plurality of scattergram related information, histogram related information, and gate related information are included in accordance with the number of scattergrams and histograms to be created.

Information Processing System of Flow Cytometer

Hereinafter, the instance where the light derived from particles is fluorescent will be specifically described as an example.

FIG. 3 shows the configuration of the information processing system of the flow cytometer 10, which includes an input unit 60, a condition input unit 61, a display unit 62, a signal processing unit 63, and a communication unit 64. The signal processing unit 63 acquires the detection signals output from the light receiving elements 100A to 100F via the amplifiers 130A to 130F and the A/D converters 131A to 131F. A temperature sensor 22 is provided to detect the temperature of the particle-containing liquid and output a temperature detection signal converted into an electric signal; the signal processing unit 63 acquires the temperature detection signal from the temperature sensor 22 through the temperature detection circuit 132 and the A/D conversion unit 133.

The input unit 60 is configured by a barcode reader and accepts input of information for specifying measurement items by reading a barcode attached to a container containing a reagent to be mixed with particles. Note that the input unit 60 may be an RFID reader that reads information for specifying a measurement item from a tag attached to a container. The input unit 60 also may be configured by at least one of a keyboard and a mouse, and the user may manually input information for specifying measurement items or select from among a plurality of options prepared in advance.

For example, the condition input unit 61 may be configured with at least one of a keyboard, a mouse, and a touch panel to accept input of measurement conditions when a user inputs measurement conditions.

The display unit 62 is configured by, for example, a monitor, and displays the screens 90 to 96 shown in FIGS. 6 to 12 and the analysis result.

The input unit 60, the condition input unit 61, and the display unit 62 are disposed in the information processing apparatus 14 connected to the flow cytometer main body 13, but also may be arranged in the flow cytometer main body 13.

The communication unit 64 is configured by a communication device for communicating with the external server 11 via the network 12 according to a predetermined communication standard. Information for specifying measurement items is transmitted to the external server 11 via the network 12, and measurement conditions and the like corresponding to information for specifying measurement items are received from the external server 11 via the network 12.

The signal processing unit 63 includes a memory 82 used as a work area for data processing, a storage unit 83 for recording programs and processing data, a CPU (Central Processing Unit) 81 for performing data processing described later, a bus 84 for relaying data between units, and interface units (I/F units in FIGS. 3) 85 and 86 which perform data input/output between the respective units 60, 61, 62, and 64 connected to the signal processing unit 63, or inputs detection signals output from the light receiving devices 100A to 100F via the amplifiers 130A, 130F and A/D conversion units 131A to 131F, or inputs a temperature detection signal from the temperature sensor 22 via the temperature detection circuit 132 and the A/D conversion unit 133.

In the following description, unless otherwise specified, the processing performed by the signal processing unit 63 actually means the processing performed by the CPU 81 of the signal processing unit 63. The CPU 81 temporarily stores necessary data (such as intermediate data being processed) using the memory 82 as a work area, and records data to be stored longterm in the storage unit 83.

By executing a program stored in the storage unit 83 or the memory 82, the signal processing unit 63 performs data processing to realize the functions of a measurement item acquisition unit 70, a measurement condition selection unit 71, a measurement condition storage unit 72, a first measurement condition setting unit 73, a temperature correction unit 74, a data processing unit 75, a second measurement condition setting unit 76, and a calculation unit 77, and controls the operation of each unit connected to the signal processing unit 63.

Operation of Information Processing System of Flow Cytometer

Figure 13:
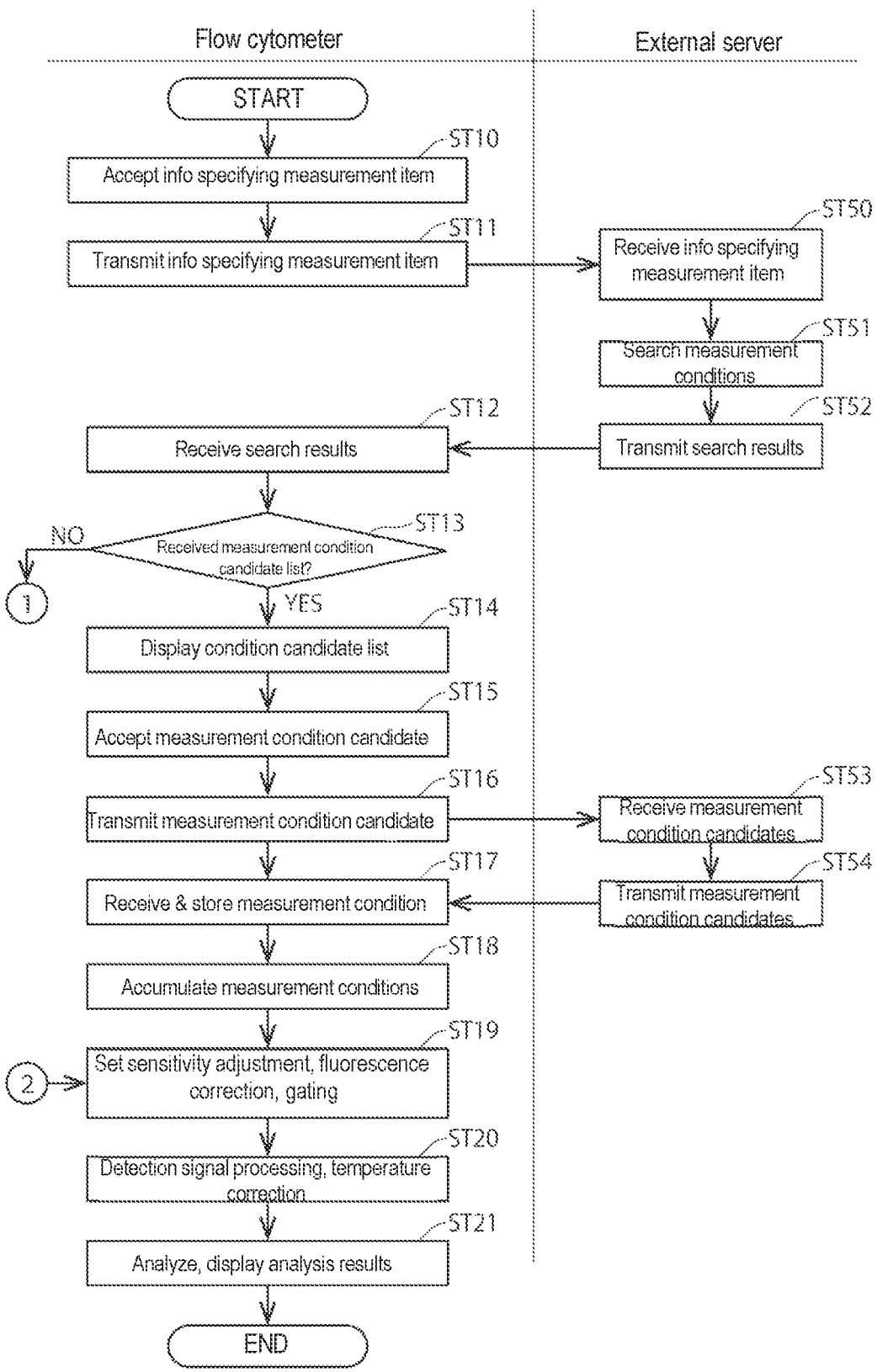
FIG. 13 is a flowchart illustrating the operation of the signal processing unit.

FIG. 13 is a flowchart illustrating the operation of the signal processing unit 63 and the external server 11 of the flow cytometer 10 of the invention. The measurement item acquisition unit 70 performs the process ST10, the measurement condition selection unit 71 performs process ST11 to ST16, the measurement condition storage unit 72 performs processes ST17 and ST18, the first measurement condition setting unit 73 and temperature correction unit 74 perform the process of ST19, data processing unit 75 performs the process ST20, and the process ST21 is performed by the calculation unit 77. The processes from ST50 to ST54 are performed in the external server 11. Note that the information that the signal processing unit 63 exchanges with the external server 11 is performed via the communication unit 64.

In ST10, the signal processing unit 63 acquires information for specifying the measurement item. For example, using the barcode reader as the input unit 60, information for specifying the measurement item is read from the barcode attached to the reagent container. The information for specifying the measurement item is, for example, the identification information of the reagent mixed with the particle. In ST11, the signal processing unit 63 transmits information for specifying the measurement item to the external server 11. Note that the barcode attached to the reagent container also may include manufacturer identification information for identifying the manufacturer of the reagent. In that case, the measurement condition is received from the external server 11 only when manufacturer identification information indicating a specific manufacturer is acquired from the bar code of the reagent container, and a notice indicating a measurement condition is not received is displayed on the display unit 62 when the manufacturer identification information indicating a specific manufacturer is not obtained.

In ST50, the external server 11 receives information for specifying the measurement item. In ST51, the external server 11 searches whether a measurement condition corresponding to information (identification information of the reagent) for specifying this measurement item exists in the database and, in ST52, the search result is transmitted to the signal processing unit 63. The search result is either information on a list (hereinafter referred to as "measurement condition candidate list") showing one or more measurement condition candidates corresponding to the information (identification information of the reagent) for specifying the measurement item, or information indicating that there is no corresponding measurement condition. The measurement condition candidate list includes the measurement condition name, measurement condition description and the like corresponding to the measurement items that can be measured using the reagent in the reagent container from which the identification information of the reagent was read in ST10. For example, when the identification information of the reagent containing the labeled antibody against CD4, the labeled antibody against CD45 or the like is read in ST10, the measurement conditions corresponding to the HIV test, the hematopoietic stem cell test and the like that can be carried out using these labeled antibodies are included in the list.

In ST12, the signal processing unit 63 receives the search result from the external server 11 via the network 12. In ST13, the signal processing unit 63 determines whether information on the measurement condition candidate list has been received, or information indicating that there is no measurement condition has been received. Upon receiving the measurement condition candidate list corresponding to the information for specifying the measurement item, the signal processing unit 63 displays screen 90 that shows the measurement condition candidate list shown in FIG. 6 on the display unit 62 in ST14. When there is no measurement condition corresponding to the information for specifying the measurement item in the database, the process proceeds to ST31 shown in FIG. 14. In ST15, upon receiving the measurement condition candidate selected from the measurement condition candidate list by the user, the signal processing unit 63 transmits the accepted measurement condition candidate to the external server 11 via the network 12 in ST16.

In ST53, the external server 11 receives the measurement condition candidate selected by the user, and in ST54 transmits the measurement condition corresponding to the selected measurement condition candidate. In ST17, the signal processing unit 63 receives the measurement condition corresponding to the selected measurement condition candidate from the external server 11 via the network 12, and stores it in the storage unit 83. In the storage unit 83, the name indicating the measurement item and the measurement condition are associated and stored.

When there is only one measurement condition corresponding to the information for specifying the measurement item in the external server 11, the signal processing unit 63 also may receive and store the measurement condition without receiving a measurement condition candidate list from the external server 11. That is, ST52 and ST53 are skipped, and ST12 to ST16 are skipped.

In ST18, the signal processing unit 63 accumulates the measurement conditions received from the external server 11. That is, the received measurement condition is added to the measurement condition list in which the measurement conditions received in the past are stored, and this list is stored. In ST19, the signal processing unit 63 sets measurement conditions. The setting of the measurement conditions entails adjusting the amplification degree of the output voltage of the light receiving element or the voltage applied to the light receiving element by using the information relating to the adjustment of the detection sensitivity, and determining the amount of light wavelength distribution outside the detection target included in the detected optical information (referred to as "fluorescence correction setting") using information relating to the correction of the detected optical information, and determining the region of each particle to be selected from the distribution chart by using the information related to the gating.

Detection signals output from the light receiving elements 100A to 100F are input to the signal processing section 63 via the amplifying sections 130A to 130F and the A/D converting sections 131A to 131F. In ST20, the signal processing unit 63 performs correction of this detection signal, that is, so-called fluorescence correction, by using the light wavelength distribution amount outside the detection target included in the detected optical information. The signal processing unit 63 also reads out a calculation formula used for temperature correction from the measurement conditions stored in the storage unit 83, and uses the temperature detection signal output from the temperature sensor 22 and the calculation formula to correct the detection signals output from the light receiving elements 100A to 100F, which will be described later in detail. In ST21, the signal processing unit 63 performs analyses including the measurement of the number of particles using the fluorescence correction and the temperature-corrected detection signal, and outputs the analysis result. The output of the analysis result is, for example, displaying the analysis result on the display unit 62 together with the distribution chart.

Note that the signal processing unit 63 also may store the input detection signal in the storage unit 83 without displaying the analysis and the analysis result of ST21, and the communication unit 64 may transmit the detection signal stored in the storage unit 83 to external server 11 or another external server other than the external server 11, such that the analysis performed by the external server 11 or another external server other than the external server 11 can be displayed as analysis results.

Figure 14:
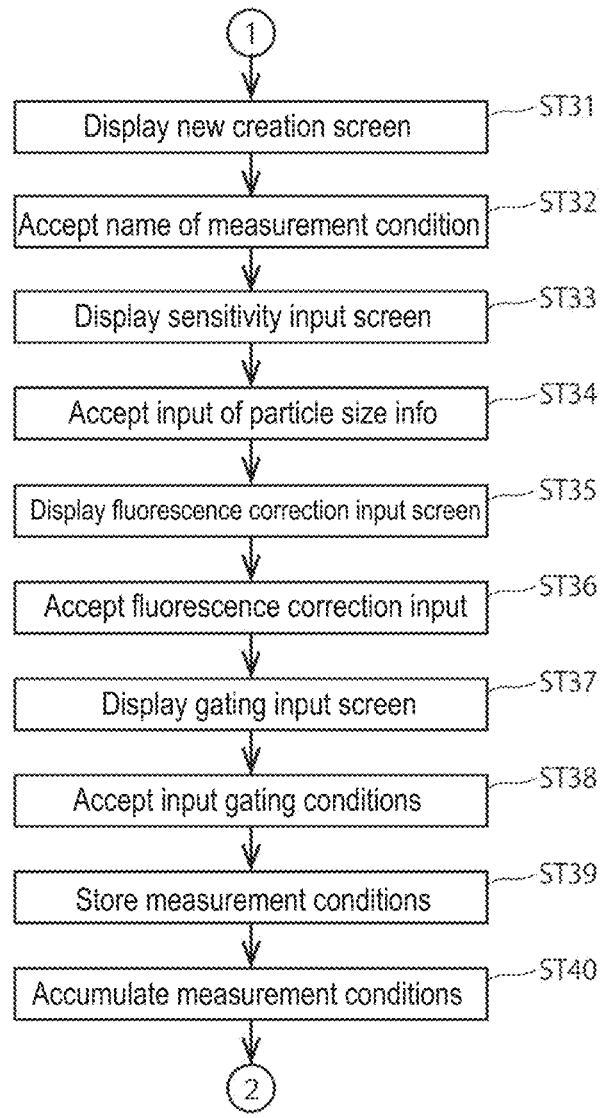
FIG. 14 is a flowchart illustrating an operation of a user inputting measurement conditions.

FIG. 14 is a flow chart describing the sequence of the operation of accepting input of a measurement condition by a user when the communication unit 64 does not receive a measurement condition from the external server 11 because there is no measurement condition corresponding to the information for specifying a measurement item in the external server 11. The processes from ST31 to ST40 are performed by the second measurement condition setting unit 76. In the processes from ST31 to ST40, the screens 91 to 95 for the user to perform the input operation of the measurement condition from the condition input unit 61 are sequentially displayed on the display unit 62 in the wizard format, and the measurement conditions input by the user are set.

Figure 7:
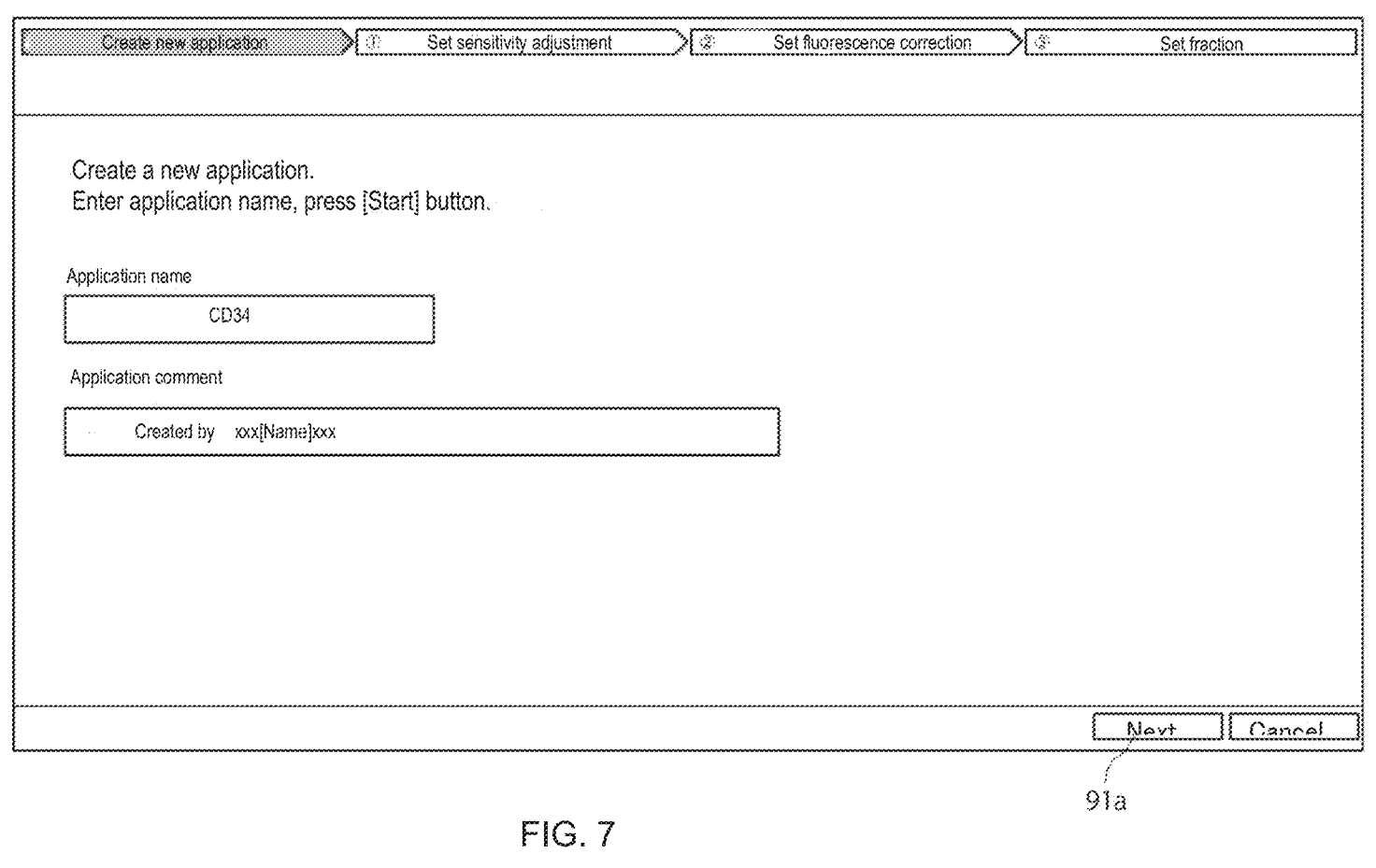

In ST31, the signal processing unit 63 displays the new creation screen 91 shown in FIG. 7 on the display unit 62. In ST32, the signal processing unit 63 accepts the name of the measurement condition and comment and the like input by the user in the input box on the screen 91.

Figure 8:
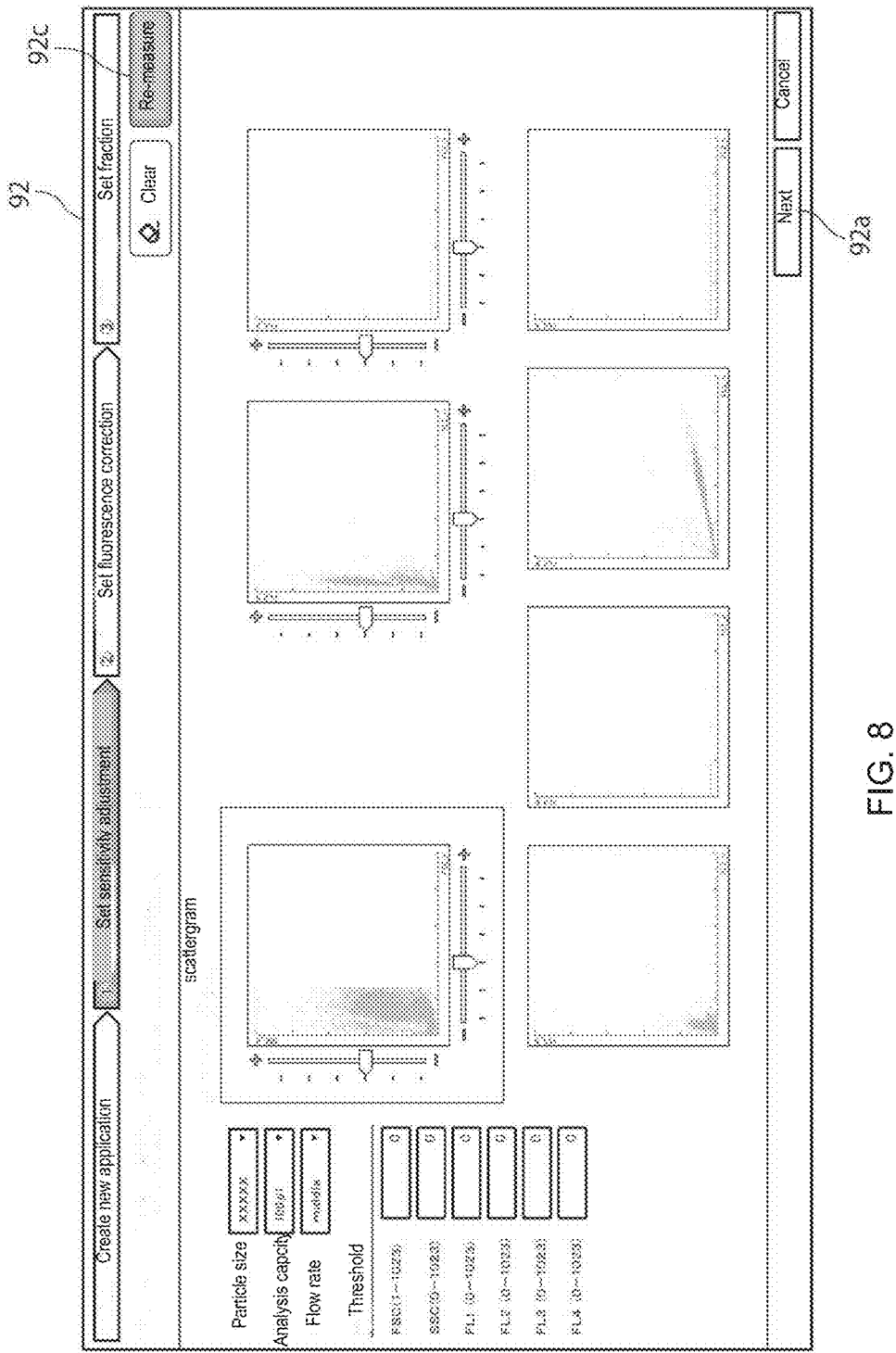
FIG. 8 is a diagram showing a sensitivity input screen.

When the user presses a "next" button 91a on the screen 91 and the signal processing unit 63 accepts a screen switching instruction, the signal processing unit 63 displays on the display unit 62 a screen (hereinafter referred to as "sensitivity input screen") 92 for inputting information relating to adjustment of the detection sensitivity in order to detect the optical information shown in FIG. 8 in ST33. The sensitivity input screen 92 is information related to adjustment of the detection sensitivity, and is a screen for allowing the user to input information related to the size of the particles in the particle-containing liquid, for example, the size of the particles such as the diameter of the particle, the name of the particle, the name of the measurement item and the like. Also, the particle size may be input in three stages of "large", "medium" and "small".

In ST34, the signal processing unit 63 receives information on the size of the particles in the particle-containing liquid which the user inputs in the input box on the screen 92. The storage unit 83 stores a value indicating the amplification degree of the output voltage of the light receiving elements 100A and 100B corresponding to the information on the size of the particles in the particle containing liquid and stores the voltage value applied to the light receiving elements 100C to 100F, and the signal processing unit 63 reads the value indicating the amplification degree corresponding to the particle size and the voltage value from the storage unit 83 as information relating to adjustment of the detection sensitivity.

Figure 9:
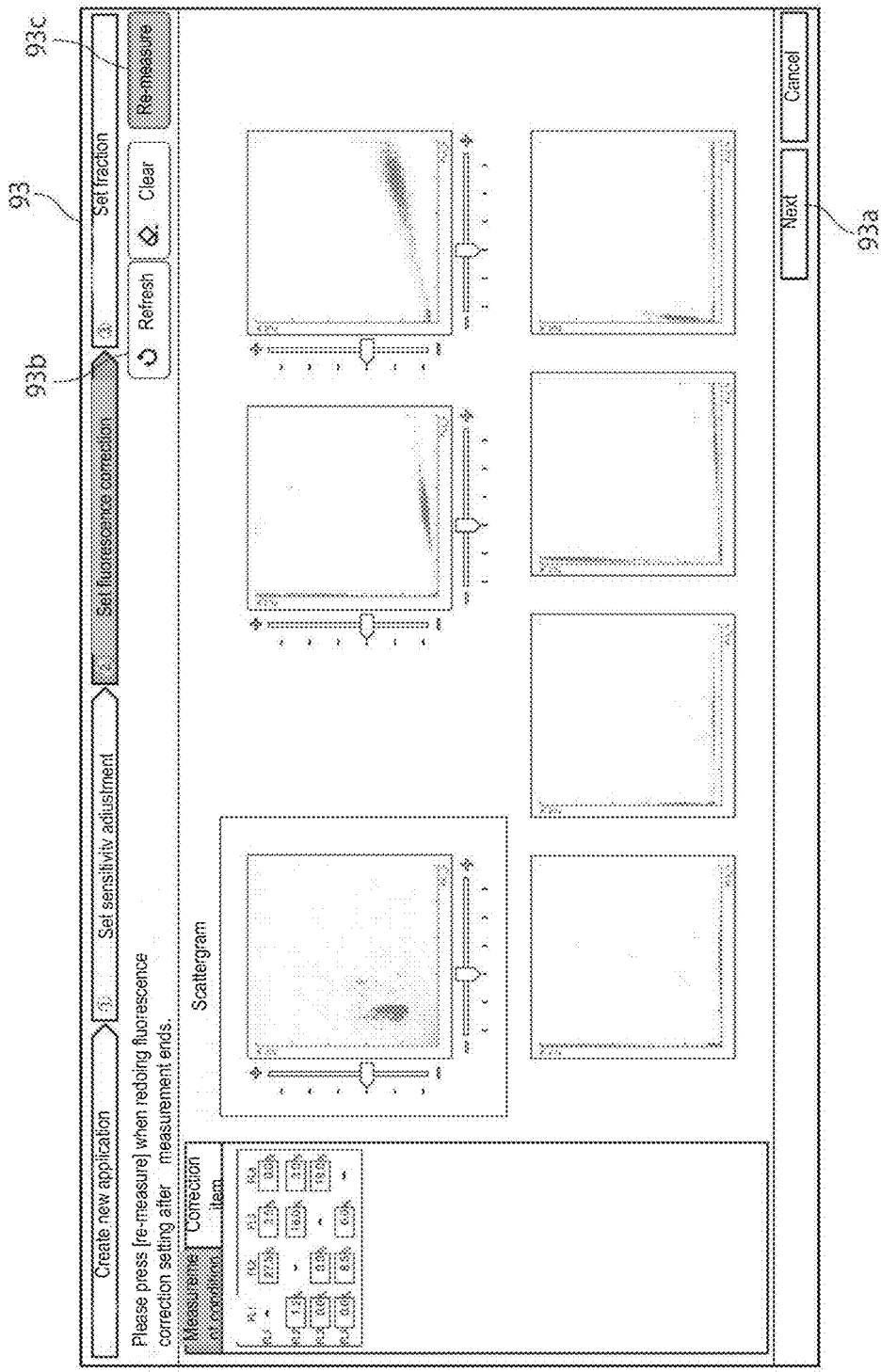
FIG. 9 is a diagram showing a fluorescence correction value input screen.
Figure 10:
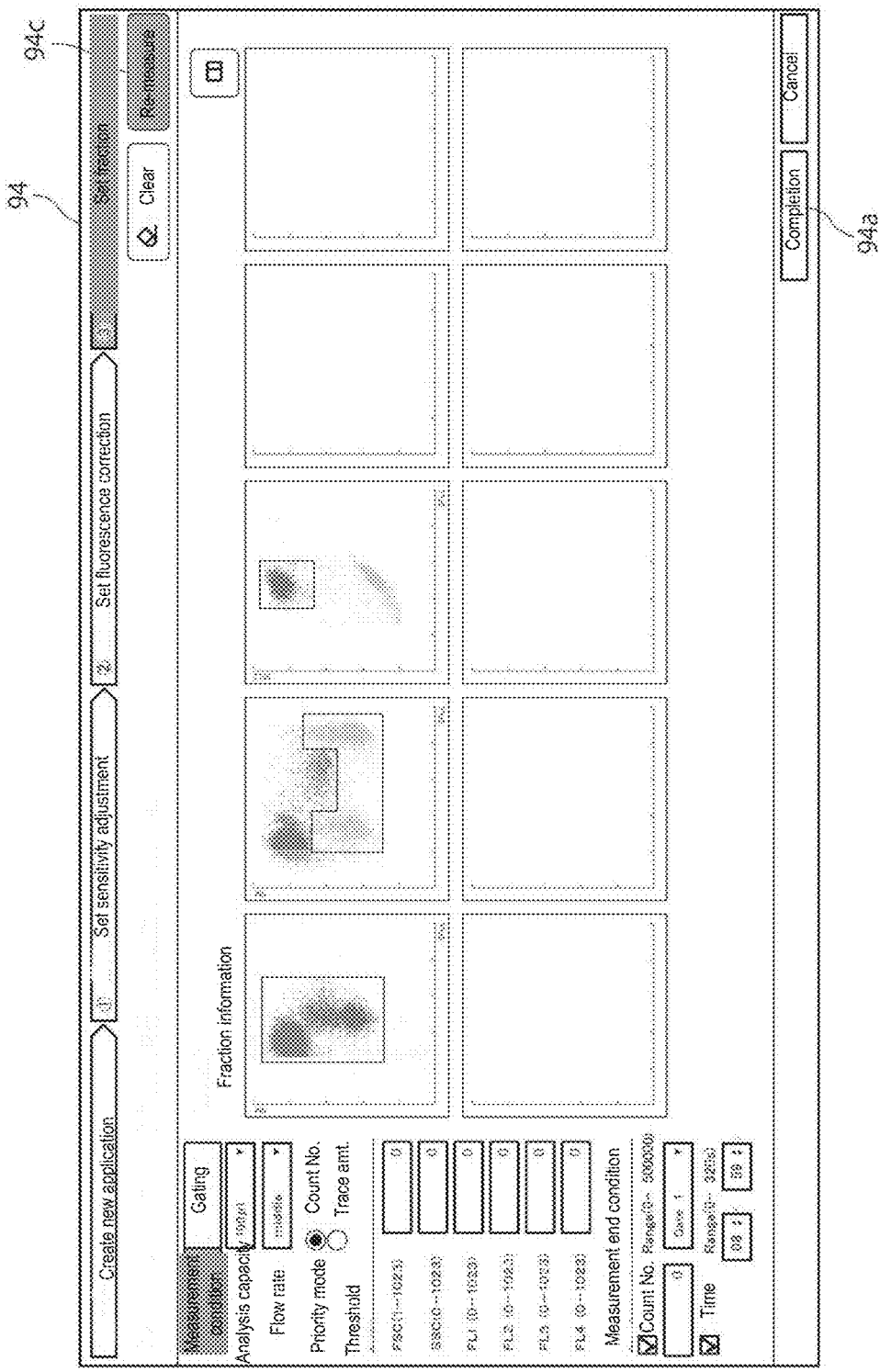
FIG. 10 is a diagram showing a gating input screen.
Figure 11:
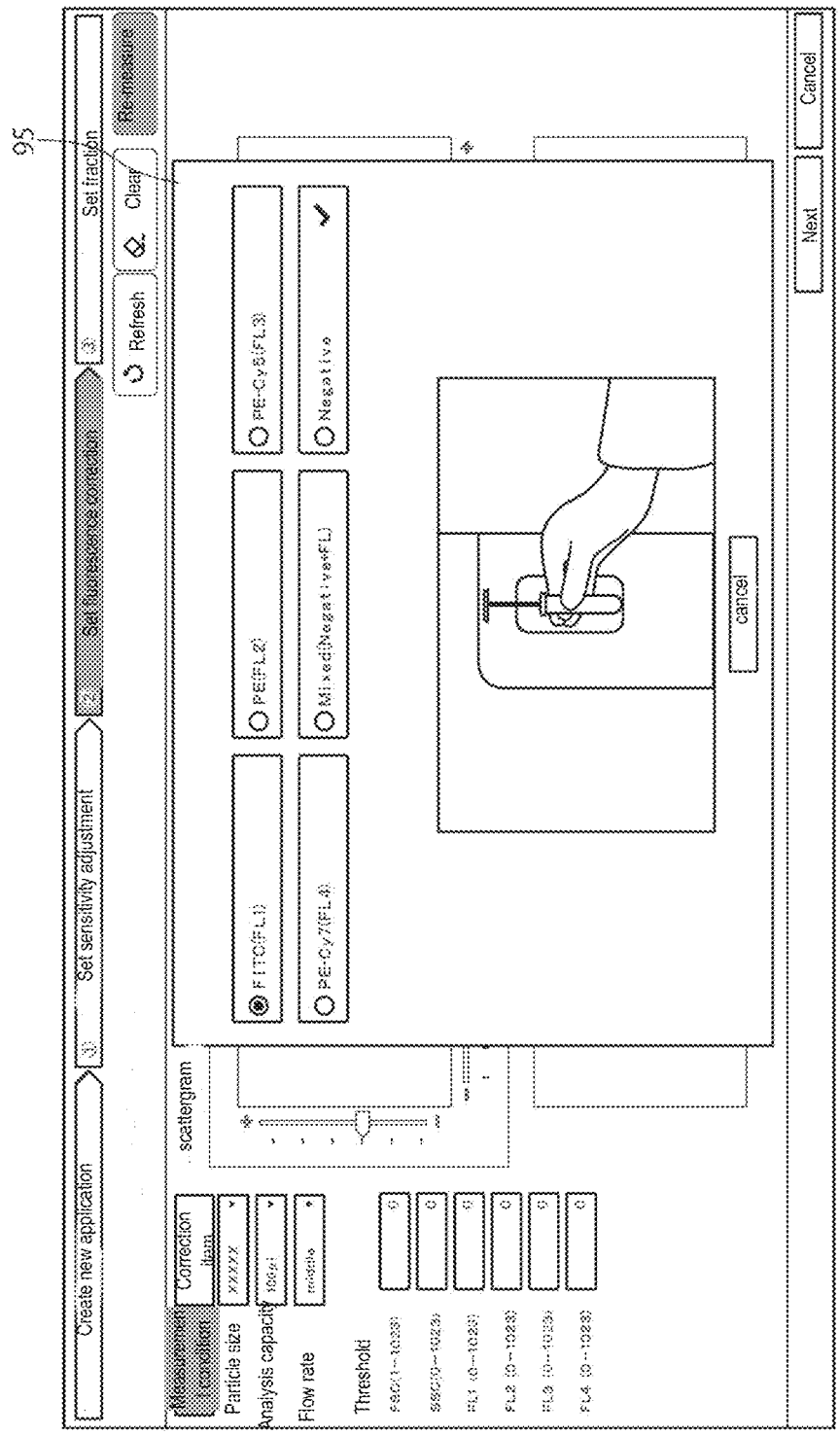
FIG. 11 is a view of a measurement instruction screen.

When the signal processing unit 63 accepts a screen switching instruction by the user pressing the "Next" button 92a on the screen 92, in ST35 the signal processing unit 63 displays the detected optical information shown in FIG. 9 (hereinafter referred to as "fluorescence correction value input screen") 93 on the display unit 62. In ST36, the signal processing unit 63 receives information (also referred to as "fluorescence correction value") relating to the light wavelength distribution amount other than the detection target included in the detected optical information. The fluorescence correction value is entered by the user in an input box on this screen 93. When the signal processing unit 63 accepts a screen switching instruction by the user pressing the "Next" button 93a on the screen 93, in ST37, the signal processing unit 63 displays on the display unit 62 a screen (hereinafter referred to as "gating input screen") 94 for setting an area of selected particles based on the optical information, as shown in FIG. 10. In ST38, the signal processing unit 63 receives information related to gating that the user input in the input box on the screen 94.

When the user presses the "completion" button 94a on the screen 94 and the signal processing unit 63 accepts the input completion instruction, then in ST39 the signal processing unit 63 stores the value indicating degree of amplification of the output voltage of the light receiving elements 100A and 100B, voltage value applied to the light receiving elements 100C to 100F, fluorescence correction value, and information related to gating from the user as measurement conditions. In ST40, the signal processing unit 63 accumulates measurement conditions input by the user. That is, the measurement condition input by the user is added to the measurement condition list in which the measurement conditions received in the past are accumulated, and this list is stored. Note that a list of measurement conditions in which both measurement conditions input by the user and measurement conditions received from the external server 11 are both stored also may be stored, and a measurement condition list of accumulated measurement conditions input by the user and a measurement condition list of accumulated measurement conditions received from the external server 11 also may be stored.

Returning to ST19 in FIG. 13, adjustments of the detection sensitivity, fluorescence correction, and gating are set using the stored measurement conditions.

When inputting each information on the screens 92, 93, 94, the user preliminarily measures a control sample consisting of artificially created components such as a single-dye control sample stained only with FITC, for example, one or more times, then, based on the measurement result, a value indicating an appropriate amplification degree, a voltage value, a fluorescence correction value, and information related to gating may be determined. Upon receiving a measurement instruction of the control sample from the user while each screen 92, 93, 94 is displayed, the signal processing unit 63 causes the measurement instruction screen 95 shown in FIG. 11 to be displayed on the screens 92, 93, and 94. When the measurement sample is selected according to the instruction of the screen 95, the signal processing unit 63 confirms that the control sample is set at the predetermined position, and starts the preliminary measurement according to the measurement instruction. When the user presses the "remeasure" buttons 92c, 93c, 94c on the screens 92, 93, 94, the signal processing unit 63 performs the preliminary measurement again. On screen 93, when the user presses the "redraw" button 93b on the screen 93, the signal processing unit 63 redisplays the distribution diagram of the scattergram and the like on the screen 93.

The order of displaying the screens 92, 93, and 94 is not limited, and may be in any order.

Figure 12:
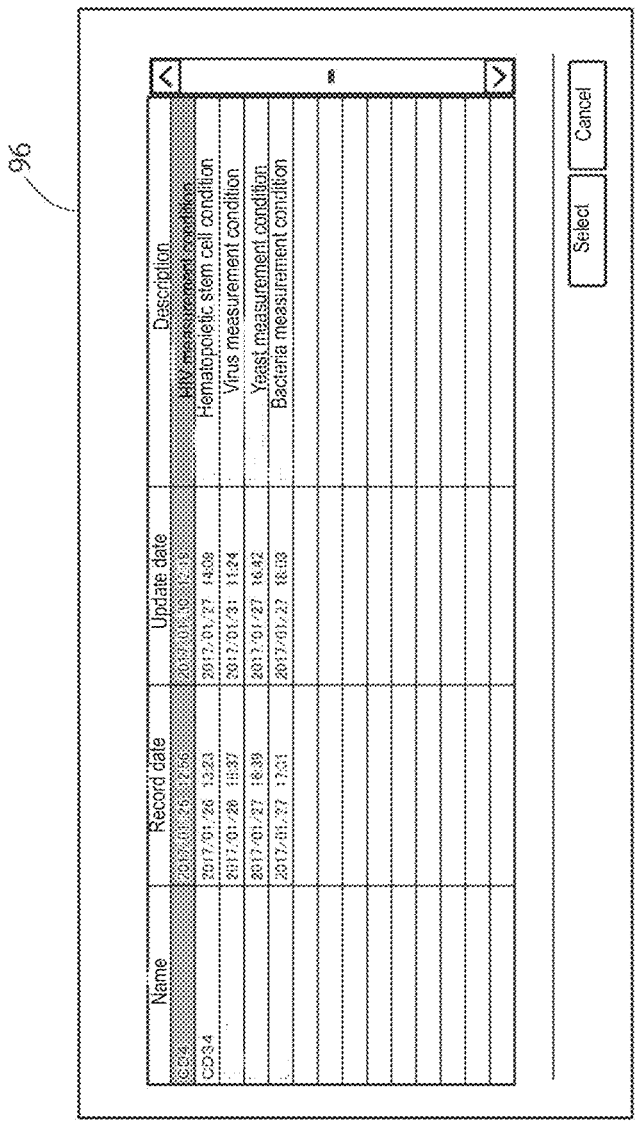
FIG. 12 is a view of a screen showing a list of measurement conditions.

When it is desired to reuse the measurement condition used in the past after the completion of the measurement, the signal processing unit 63 calls up the accumulated measurement condition list according to the user's request, and displays a screen 96 that displays the measurement condition list shown in FIG. 12, and displays this list on the display unit 62. Upon receiving the measurement condition selected from the measurement condition list by the user, the signal processing unit 63 sets this measurement condition in the same manner as ST19.

Temperature Correction by Temperature Sensor

Regarding the temperature correction of the detection signals of the light receiving elements 100A to 100F, a method of detecting the temperature of the particle containing liquid by the temperature sensor 22 will be described.

Figure 15:
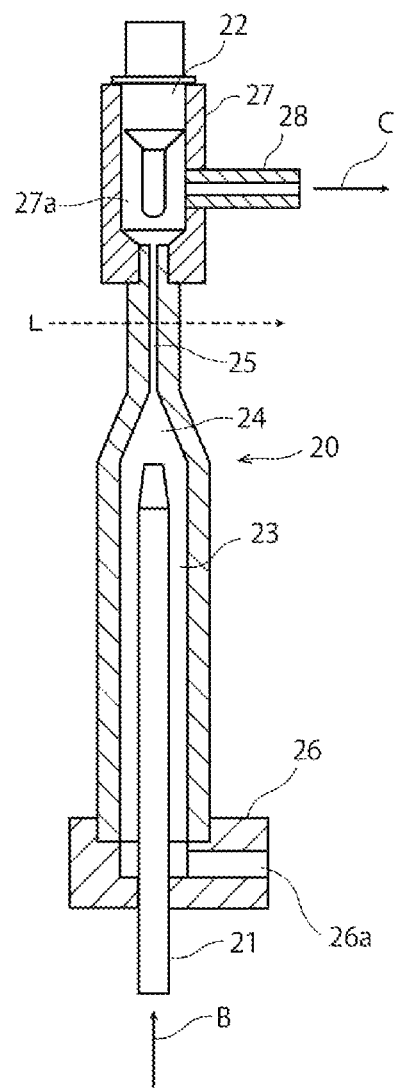
FIG. 15 is a cross-sectional view of a flow cell.

The flow cell 20 shown in FIG. 15 includes a rectification part 23, an acceleration part 24, and an orifice part 25. The rectification part 23 is cylindrical and has a through hole. The acceleration part 24 is conical, and the diameter of the hole communicating with the hole of the rectification part 23 gradually decreases toward the orifice part 25. The orifice part 25 of the flow cell 20 is a transparent rectangular tube having a square cross section, and the particle-containing liquid passing through the hole is irradiated with the light L from the light sources 101 and 124.

The flow cell 20 is fixed to the fixture 26, and the nozzle 21 is inserted into the flow cell 20 and attached to the fixture 26. A sensor setting member 27 having a flow path 27a is connected to an outlet of the orifice part 25 of the flow cell 20. The sensor setting member 27 is provided with a temperature sensor 22 and a nipple 28. The particle-containing liquid introduced into the flow path 27a from the orifice part 25 contacts the temperature sensor 22 and is discharged from the nipple 28. In this case, a thermistor (PB3M-35-TI type manufactured by Shibaura Electronics Co., Ltd.) is used as the temperature sensor 22.

The sheath liquid flowing in from the inflow port 26a of the fixture 26 is rectified by the rectification part 23, and the flow is accelerated by the acceleration part 24. When the sample flowing into the nozzle 21 from the direction of the arrow B is ejected from the tip of the nozzle 21 toward the orifice part 25, the sample is enveloped by the accelerated sheath liquid, and passes through the orifice part 25 as a particle-containing liquid. Light L is irradiated on the particle-containing liquid, and light derived from the particles in the particle-containing liquid is detected by light receiving elements 100A to 100F shown in FIG. 2.

In the sensor setting member 27, the liquid temperature of the particle-containing liquid that has passed through the orifice section 25 is detected by the temperature sensor 22, and the liquid is discharged from the nipple 28 in the direction of arrow C.

Note that the above-described mounting position of the temperature sensor 22 is an example, and the temperature sensor 22 also may be provided, for example, at the entrance or the vicinity of the flow cell 20 as long as it is attached to a certain position, or it may be provided outside the flow cell 10 insofar as the temperature sensor 22 is attached at a position where the temperature of the particles to be detected is substantially the same as the temperature of the particle-containing liquid passing through the orifice part 25.

The temperature correction of the detection signals of the light receiving elements 100A to 100F will be described next. Temperature correction is performed by the temperature correction unit 74 of the signal processing unit 63, for example, by using the temperature detection signal converted into the electric signal output from the temperature sensor 22, and amplifying the detection signals of the light receiving elements 100A to 100F in each amplification unit 130A to 130F connected to each light receiving element 100A to 100F. The signal processing unit 63 acquires the temperature detected by the temperature sensor 22 via the thermistor circuit 132 and A/D conversion unit 133.

Detection signals of the light receiving elements 100A to 100F are input to the amplifying sections 130A to 130F. A 0.5 V constant voltage is input to the amplification unit as the low level reference voltage RL, and a control voltage is input from the signal processing unit 63 as the high level/reference voltage RH.

A correction curve (actually measured values) of the detection signal of the light receiving elements 100A to 100F relative to the temperature detected by the temperature sensor 22 shows the relationship of the control voltage to the temperature (° C.). For example, when the measurement item is reticulocyte, it is expressed as calculation formula (A). $y = 4.4838(x-23)^2 - 64.815(x-23) + 3031 \ldots$ (A), where x is the temperature (° C.) detected by the temperature sensor 22, and y is the control voltage (digital value). The calculation formula (A) is received from the external server 11 as a measurement condition for each measurement item.

The ratio of the output to the input of the A/D converter, that is, the amplification factor, is determined by the difference (RH−RL) between RH and RL. Since RL is constant, the degree of amplification is controlled by RH, that is, the control voltage determined by the calculation formula (A), and the detection signals of the light receiving elements 100A to 100F are temperature-corrected by the detected temperature of the temperature sensor 22.

Although the amplification degree of the amplification units 130A to 130F is controlled in the above embodiment, the temperature correction method is not limited to this method, inasmuch as, for example, the respectively voltage applied to the light receiving elements 100A to 100F also may be adjusted based on the temperature detection signal of the temperature sensor 22. The analysis result obtained by the calculation unit 77 also may be corrected.

Note that the temperature sensor 22, the temperature detection circuit 132, the A/D conversion unit 133, and the temperature correction unit 74 of the signal processing unit 63 also may be omitted so that the temperature correction is not performed.

According to the invention, an appropriate measurement condition is selected from one or a plurality of measurement conditions according to measurement items. For example, a measurement condition is selected from one or a plurality of measurement conditions received from the external server 11. Therefore, it is not necessary for the user to input complicated measurement conditions himself. Therefore, measurement conditions can be easily set even by a non-specialist technician who has not received specialized training. In the case where there is no measurement condition corresponding to the information for specifying the measurement item in the external server and the measurement condition can not be received, the user can set the measurement condition from the condition input unit 61.

The flow cytometer 10 of another embodiment includes a temperature sensor for detecting the temperature inside the flow cytometer 10 and outputting a temperature detection signal converted into an electric signal, and a temperature adjustment device for heating or cooling the interior of the flow cytometer 10 provided at an arbitrary position within the flow cytometer 10. The temperature adjustment device includes, for example, at least one of a heater and a fan. The signal processing unit 63 does not include the temperature correction unit 74. The temperature adjustment device is connected to the signal processing unit 63, and the temperature adjustment device performs controls so that the temperature in the flow cytometer 10 becomes a target temperature using the temperature detection signal output from the temperature sensor 22. The target temperature may be included in the measurement condition received from the external server 11 by the signal processing unit 63, or may be stored in advance in the signal processing unit 63. Since the temperature inside the flow cytometer 10 is kept constant, the signal processing unit 63 does not need to perform temperature compensation on the detection signal output from the light receiving elements 100A to 100F. Once the measurement condition corresponding to the information for specifying the measurement item is received and the measurement is started, there is no need for the user to change the measurement condition according to the temperature. Since other configurations are the same as those of the flow cytometer 10 shown in FIGS. 1 to 15, description thereof is omitted.

Although one embodiment of the present invention has been described above, the present invention is not limited to the above-described embodiment, and various modifications are possible insofar as the modifications do not deviate from the spirit of the invention For example, although one or a plurality of measurement conditions corresponding to the identification information of the reagent are received from the external server 11, and the measurement condition is selected from among them in the embodiment, one or a plurality of measurement conditions corresponding to the identification information of the reagent also may be previously stored in the storage unit 83 of the flow cytometer 10 and the measurement condition may be selected from one or more measurement conditions read out from the storage unit 83; and measurement conditions also may be stored in advance in a storage unit of an external computer installed in the facility of the user, for example, a host computer that manages the examination room, and the flow cytometer 10 may receive the measurement condition from the host computer.

What is claimed is:

1. A flow cytometer comprising:
a measurement unit having a flow cell, at least one light source, and at least one light receiving element;
a display; and
a controller connected to the display, the controller configured to:
receive information for specifying a measurement item;
receive results of searching for preexisting measurement condition information relating to the information for specifying the measurement item;
in response to the results of searching being a failing to locate the preexisting measurement condition information, control the display to display a screen to receive an input of a new measurement condition information relating to the measurement item as a measurement condition information;
set a measurement condition corresponding to the measurement condition information;
control the measurement unit having the flow cell to optically measure particles by passing a particle-containing liquid through the flow cell according to the measurement condition; and
control the display to display a screen including a distribution map of light emitted from the particles.

2. The flow cytometer according to claim 1, comprising a communication device connected to the controller, wherein the controller is configured to:
cause the communication device to transmit the information for specifying the measurement item to an external computer via a network; and
receive, via the communication device, the results of searching from the external computer via the network.

3. The flow cytometer according to claim 2, wherein the controller is configured to:
cause the communication device to transmit the information for specifying the measurement item to an external server that is configured to update measurement conditions stored in the external server or add measurement conditions to the external server.

4. The flow cytometer of claim 3, wherein the controller is configured to:
cause the communication device to transmit the information for specifying the measurement item to the external server each time information for specifying the measurement item is received; and receive, via the communication device, a latest measurement condition information corresponding to the information for specifying the measurement item, from the external server.

5. The flow cytometer according to claim 3, wherein the controller is configured to:
   receive, from an input unit, identification information of a reagent, the identification information read from a reagent container, and manufacturer identification information for identifying a manufacturer of the reagent, the manufacturer identification information read from the reagent container, wherein the input unit includes a reader;
   determine the identification information of the reagent as the information for specifying the measurement item; and
   receive, via the communication device, the measurement condition information from the external server when the read manufacturer identification information identifies a specific manufacturer.

6. The flow cytometer according to claim 1, wherein the controller is configured to:
   determine a list of measurement condition information based on the information for specifying a measurement item;
   control the display to display the list of measurement condition information; and
   receive a selection of measurement condition information from the list of measurement condition information.

7. The flow cytometer according to claim 1, comprising:
   a temperature sensor configured to detect a temperature of the particle-containing liquid, wherein the controller is configured to control the measurement unit to measure the particles based on the measurement condition and the detected temperature.

8. The flow cytometer according to claim 1, comprising:
   a temperature sensor configured to detect a temperature in the flow cytometer; and
   a temperature regulating device configured to heat or cool inside of the flow cytometer, wherein the controller is configured to control the temperature regulating device to adjust the temperature in the flow cytometer to a target temperature based on the detected temperature.

9. The flow cytometer according to claim 1, wherein
   the at least one light source irradiates the particles with light passing through the flow cell;
   the at least one light receiving element detects the light emitted from the particles; and
   the measurement condition information is information relating to adjustment of detection sensitivity including at least one of a value indicating an amplification degree of an output voltage of the at least one light receiving element, and a voltage value applied to the at least one light receiving element.

10. The flow cytometer according to claim 1, wherein the measurement condition information includes information relating to a correction of detected light, which further includes information relating to a light wavelength distribution amount outside a detection target included in the detected light, wherein the light wavelength distribution amount is a distribution of a light wavelength and an amount of the detected light.

11. The flow cytometer according to claim 10, wherein the detected light relates to fluorescence emitted from the particles.

12. The flow cytometer according to claim 1, wherein the measurement condition information includes information relating to gating including information for setting a position for selecting particles on the distribution map of the light emitted from the particles.

13. The flow cytometer according to claim 1, comprising:
   at least three light receiving elements, wherein at least two light receiving elements detect a plurality of fluorescence having different peak wavelengths.

14. The flow cytometer according to claim 13, comprising a suction unit comprising an elongated member, wherein the controller is configured to:
   control the suction unit to suction, via the elongated member, a measurement sample from a sample container that contains the measurement sample as a particle-containing liquid, the measurement sample being prepared from a biological sample and a reagent containing a plurality of types of fluorescently labeled antibodies; and
   control the measurement unit to detect fluorescence derived from each fluorescence-labeled antibody contained in the suctioned measurement sample.

15. The flow cytometer according to claim 14, wherein the controller is configured to:
   control the suction unit to suction the measurement sample from the sample container via the elongated member after the sample container has been set at a predetermined position by a user.

16. The flow cytometer according to claim 1, wherein the controller is configured to:
   receive an input of identification information of a reagent mixed with particles as information for specifying the measurement item.

17. The flow cytometer according to claim 1, wherein the controller is configured to:
   receive, from an input unit connected to the controller, identification information of a reagent, wherein the identification information of the reagent is read from a reagent container containing a reagent to be mixed with particles, and wherein the input unit includes a reader.

18. The flow cytometer according to claim 1, wherein the controller is configured to:
   in response to the results of searching being a list of a plurality of preexisting measurement condition information relating to the information for specifying the measurement item, control the display to display the list of the plurality of preexisting measurement condition information.

* * * * *